(12) United States Patent
Jain et al.

(10) Patent No.: US 11,868,387 B2
(45) Date of Patent: Jan. 9, 2024

(54) METHOD AND SYSTEM FOR TABLE STRUCTURE RECOGNITION VIA DEEP SPATIAL ASSOCIATION OF WORDS

(71) Applicant: Tata Consultancy Services Limited, Mumbai (IN)

(72) Inventors: Arushi Jain, Noida (IN); Shubham Paliwal, Noida (IN); Monika Sharma, Noida (IN); Lovekesh Vig, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 63 days.

(21) Appl. No.: 17/807,215

(22) Filed: Jun. 16, 2022

(65) Prior Publication Data
US 2023/0055391 A1 Feb. 23, 2023

(30) Foreign Application Priority Data
Jul. 26, 2021 (IN) .............................. 202121033557

(51) Int. Cl.
G06F 16/35 (2019.01)
G06F 16/335 (2019.01)
(Continued)

(52) U.S. Cl.
CPC .......... *G06F 16/358* (2019.01); *G06F 16/335* (2019.01); *G06F 16/355* (2019.01); *G06F 16/9024* (2019.01); *G06F 18/24147* (2023.01)

(58) Field of Classification Search
None
See application file for complete search history.

(56) References Cited

U.S. PATENT DOCUMENTS

| 11,734,576 B2 * | 8/2023 | Wang | G06N 3/088 |
|---|---|---|---|
| | | | 706/20 |
| 2022/0318545 A1 * | 10/2022 | Poff | G06V 30/412 |
| 2023/0306768 A1 * | 9/2023 | Cao | G06V 30/19173 |
| | | | 382/159 |

FOREIGN PATENT DOCUMENTS

| WO | WO2021053687 A1 | 3/2021 | |
|---|---|---|---|
| WO | WO-2021102632 A1 * | 6/2021 | ........... G06F 16/288 |

OTHER PUBLICATIONS

Klampfl, Stefan, Kris Jack, and Roman Kern. "A comparison of two unsupervised table recognition methods from digital scientific articles." D-Lib Magazine 20.11 (2014): 7. (Year: 2014).*

(Continued)

*Primary Examiner* — Uyen T Le
(74) *Attorney, Agent, or Firm* — Finnegan, Henderson, Farabow, Garrett & Dunner LLP

(57) ABSTRACT

State of art techniques that utilize spatial association based Table structure Recognition (TSR) have limitation in selecting minimal but most informative word pairs to generate digital table representation. Embodiments herein provide a method and system for TSR from an table image via deep spatial association of words using optimal number of word pairs, analyzed by a single classifier to determine word association. The optimal number of word pairs are identified by utilizing immediate left neighbors and immediate top neighbors approach followed redundant word pair elimination, thus enabling accurate capture of structural feature of even complex table images via minimal word pairs. The reduced number of word pairs in combination with the single classifier trained to determine the word associations into classes comprising as same cell, same row, same column and unrelated, provides TSR pipeline with reduced computational complexity, consuming less resources still (Continued)

generating more accurate digital representation of complex tables.

9 Claims, 18 Drawing Sheets

(51) Int. Cl.
    *G06F 16/901*     (2019.01)
    *G06F 18/2413*     (2023.01)

(56) References Cited

OTHER PUBLICATIONS

Xue, W., Yu, B., Wang, W., Tao, D., & Li, Q. (2021). Tgrnet: A table graph reconstruction network for table structure recognition. In Proceedings of the IEEE/CVF International Conference on Computer Vision (pp. 1295-1304). (Year: 2021).*

Ramel, J. Y., Crucianu, M., Vincent, N., & Faure, C. (Aug. 2003). Detection, extraction and representation of tables. In Seventh International Conference on Document Analysis and Recognition, 2003. Proceedings. (pp. 374-378). IEEE. (Year: 2003).*

Sachin Raja et al., "Table Structure Recognition using Top-Down and Bottom-Up Cues," Computer Vision and Pattern Recognition, Oct. 2020, Arxiv, https://arxiv.org/pdf/2010.04565.pdf.

Darshan Adiga et al., "Table Structure Recognition Based on Cell Relationship, a Bottom-Up Approach," Recent Advances in Natural Language Processing, Sep. 2019, ACL Anthology, https://www.researchgate.net/publication/336847769_Table_Structure_Recognition_Based_on_Cell_Relationship_a_Bottom-Up_Approach/link/5dba713f92851c8180193e9d/download.

Shah Rukh Qasim et al. "Rethinking Table Recognition using Graph Neural Networks," Machine Learning, Jul. 2019, Arxiv, https://arxiv.org/pdf/1905.13391.pdf.

Sebastian Schreiber et al. "DeepDeSRT: Deep Learning for Detection and Structure Recognition of Tables in Document Images," 14th IAPR International Conference on Document Analysis and Recognition (ICDAR), Nov. 2017, IEEE, https://www.dfki.de/fileadmin/user_upload/import/9672_PID4966073.pdfs.

* cited by examiner

| Level of Care | Provider | Cumulative Events | |
|---|---|---|---|
| | | No. | % |
| Government | VHW* | 5 | 0.8% |
| | Dispensary | 92 | 14.5% |
| | Health Centre | 104 | 16.4% |
| | Hospital | 67 | 10.6% |
| Home | Mothers | 19 | 3.0% |
| | Family | 64 | 10.1% |
| | Drug Shops | 36 | 5.7% |
| Non-Government | Dispensary | 77 | 12.2% |
| | Health Centre | 39 | 6.2% |
| | Hospital | 30 | 4.7% |
| | TM** as Practitioner | 73 | 11.5% |
| | TM** at Home | 27 | 4.3% |
| | Total care seeking | 633 | 100.0% |

Immediate left neighbors

FIG. 4A

| Level of Care | Provider | Cumulative Events | |
|---|---|---|---|
| | | No. | % |
| ▮▮▮ | ▮▮▮ | 5 | 0.8% |
| | Dispensary | 92 | 14.5% |
| | Health Centre | 104 | 16.4% |
| | Hospital | 67 | 10.6% |
| Home | Mothers | 19 | 3.0% |
| | Family | 64 | 10.1% |
| | Drug Shops | 36 | 5.7% |
| Non-Government | Dispensary | 77 | 12.2% |
| | Health Centre | 39 | 6.2% |
| | Hospital | 30 | 4.7% |
| | TM** at Practitioner | 73 | 11.5% |
| | TM** at Home | 27 | 4.3% |
| | Total care seeking | 633 | 100.0% |

FIG. 6A

| Level of Care | Provider | Cumulative Events | |
|---|---|---|---|
| | | No. | % |
| Government | ▮ | 5 | 0.8% |
| | Dispensary | 92 | 14.5% |
| | Health Centre | 104 | 16.4% |
| | Hospital | 67 | 10.6% |
| ▮ | Mothers | 19 | 3.0% |
| | Family | 64 | 10.1% |
| | Drug Shops | 36 | 5.7% |
| Non-Government | Dispensary | 77 | 12.2% |
| | Health Centre | 39 | 6.2% |
| | Hospital | 30 | 4.7% |
| | TM** Practitioner | 73 | 11.5% |
| | TM** at Home | 27 | 4.3% |
| | Total care seeking | 633 | 100.0% |

FIG. 6B

| Level of Care | Provider | Cumulative Events | |
|---|---|---|---|
| | | | % |
| Government | ▓▓▓ | 5 | 0.8% |
| | Dispensary | 92 | 14.5% |
| | Health Centre | 104 | 16.4% |
| | Hospital | 67 | 10.6% |
| Home | Mothers | 19 | 3.0% |
| | Family | 64 | 10.1% |
| | Drug Shops | 36 | 5.7% |
| Non-Government | Dispensary | 77 | 12.2% |
| | Health Centre | 39 | 6.2% |
| | Hospital | 30 | 4.7% |
| | TM** at Practitioner | 73 | 11.5% |
| | TM** at Home | 27 | 4.3% |
| | Total care seeking | 633 | 100.0% |

FIG. 6C

| Level of Care | | Cumulative Events | |
|---|---|---|---|
| | | No. | % |
| Government | | 5 | 0.8% |
| | Dispensary | 92 | 14.5% |
| | Health Centre | 104 | 16.4% |
| | Hospital | 67 | 10.6% |
| Home | Mothers | 19 | 3.0% |
| | Family | 64 | 10.1% |
| | Drug Shops | 36 | 5.7% |
| Non-Government | Dispensary | 77 | 12.2% |
| | Health Centre | 39 | 6.2% |
| | Hospital | 30 | 4.7% |
| | TM** at Practitioner | 73 | 11.5% |
| | TM** at Home | 27 | 4.3% |
| | Total care seeking | 633 | 100.0% |

FIG. 6D

| Level | | Provider | Cumulative Events | |
|---|---|---|---|---|
| | | | No. | % |
| Government | | VHW* | 5 | 0.8% |
| | | Dispensary | 92 | 14.5% |
| | | Health Centre | 104 | 16.4% |
| | | Hospital | 67 | 10.6% |
| Home | | Mothers | 19 | 3.0% |
| | | Family | 64 | 10.1% |
| | | Drug Shops | 36 | 5.7% |
| Non-Government | | Dispensary | 77 | 12.2% |
| | | Health Centre | 39 | 6.2% |
| | | Hospital | 30 | 4.7% |
| | | TM** at Practitioner | 73 | 11.5% |
| | | TM** at Home | 27 | 4.3% |
| | | Total care seeking | 633 | 100.0% |

FIG. 7

| c 1 | c 2 | c 3 |     |
|-----|-----|-----|-----|
|     |     | c 4 | c 5 |
| c 6 | c 7 | c 8 | c 9 |
|     | c 10 | c 11 | c 12 |
|     | c 13 | c 14 | c 15 |
|     | c 16 | c 17 | c 18 |
| c 19 | c 20 | c 21 | c 22 |
|     | c 23 | c 24 | c 25 |
|     | c 26 | c 27 | c 28 |
| c 29 | c 30 | c 31 | c 32 |
|     | c 33 | c 34 | c 35 |
|     | c 36 | c 37 | c 38 |
|     | c 39 | c 40 | c 41 |
|     | c 42 | c 43 | c 44 |
|     | c 45 | c 46 | c 47 |

FIG. 10

| Level of Care | Provider | Cumulative Events | |
|---|---|---|---|
| | | No. | % |
| Government | VHW* | 5 | 0.8% |
| | Dispensary | 92 | 14.5% |
| | Health Centre | 104 | 16.4% |
| | Hospital | 67 | 10.6% |
| Home | Mothers | 19 | 3.0% |
| | Family | 64 | 10.1% |
| | Drug Shops | 36 | 5.7% |
| Non-Government | Dispensary | 77 | 12.2% |
| | Health Centre | 39 | 6.2% |
| | Hospital | 30 | 4.7% |
| | TM** at Practitioner | 73 | 11.5% |
| | TM** at Home | 27 | 4.3% |
| | Total care seeking | 633 | 100.0% |

FIG. 11

METHOD AND SYSTEM FOR TABLE STRUCTURE RECOGNITION VIA DEEP SPATIAL ASSOCIATION OF WORDS

PRIORITY CLAIM

This U.S. patent application claims priority under 35 U.S.C. § 119 to: Indian Patent Application No. 202121033557, filed on 26 Jul. 2021. The entire contents of the aforementioned application are incorporated herein by reference.

TECHNICAL FIELD

The embodiments herein generally relate to document digitization and, more particularly, to a method and system for table structure recognition via deep spatial association of words.

BACKGROUND

Document digitization is a well-researched area. A bottleneck in the digitization of camera captured or scanned documents such as invoices, resumes, and insurance forms is the presence of tabular data in an unstructured format. This tabular data is required to be digitized and stored in a machine understandable format like HTML/XML to fully capture the layout and logical structure of the table. Various Table Structure Recognition (TSR) techniques have been used and proposed for table digitization. However, diversity in table layouts, complexity of nesting (spanning multiple rows and columns), multi-line texts, missing cells and overlapping columns, have made TSR a challenging task. State of art methods such as TableNet, DeepDeSRT, Graph Neural Networks based table recognition often fail to work on very complex tables having nesting, missing values, overlapping columns and the like, due to their low generalization ability. Moreover, these existing methods rely on very complex and deep neural network architectures which require huge amount of data and computational resources for their training.

Recently attempts have been made to utilize spatial association between words in the table to generate digital representation of tables. Some existing approaches require tables to be digitized in the form of pdf document, which is associated with metadata. As can be understood, often documents received in practical applications are be scanned images, without any meta data to assist TSR. Another existing approach processes input table images to determine spatial association and generate digital tables. However, the existing approach proposed utilizes more than one classification models to determine the association. This is computationally intensive demanding more resources.

Further, word association based approaches require word pairing to determine position of a word in the table with respect to other words in the table. Generating all possible word pairs is a straightforward approach for better association insights, however, as the number of word pairs increases complexity of any system increases, with time and computation effort. Thus, the above mentioned existing method utilizes a sampling approach to reduce the number of word pairs. However, such sampling methods randomly pick the word-pairs without considering their spatial associations. This will produce skewed distribution of type of word-pairs leading to biased network and hamper its performance.

Another existing approach focusing on spatial association of words utilizes a Monte-Carlo Sampling method to reduce the number of word pairs. This method basically extracts fixed number of words for predicting individual classes (same row, same column, and same cell), without focusing on the neighborhood property, thus affecting the accuracy of association. Further, this existing approach utilizes reduced pairs only during training of the neural network models used for predicting word associations but requires larger number of pairs in testing phase. Furthermore, this existing approach also utilizes more than one NN networks, thus increasing complexity, computational resources.

Thus, determining an optimal number of word pairs, with most appropriate word pair selection for accurate generation of digital representation of tables from scanned images is critical and a technical selection challenge.

SUMMARY

Embodiments of the present disclosure present technological improvements as solutions to one or more of the above-mentioned technical problems recognized by the inventors in conventional systems.

For example, in one embodiment, a method for table structure recognition via deep spatial association of words is provided. The method includes receiving an image of the table and identify a plurality of words in the table by marking a plurality of bounding boxes defined by bounding box coordinates corresponding to the plurality of words, by using a text region bounding box technique.

Further, the method includes generating a plurality of word pairs for each word among the plurality of words by pairing each word with one or more words among the plurality of words. Generating the plurality of word pairs comprises: i) pairing each word with a first set of words comprising a first predefined number of immediate top neighbors of each word, wherein the first set of words are marked by a corresponding first set of bounding boxes from among the plurality of bounding boxes. ii) pairing each word with a second set of words comprising a second predefined number of immediate left neighbors of each word, wherein the second set of words are marked by a corresponding second set of bounding boxes from among the plurality of bounding boxes, iii) merging, for each word, the paired first set of words and the paired second set of words to generate a merged word pair list, and iv) eliminating redundant pairs from the merged word pair list to generate the plurality of word pairs, wherein elimination is based on overlapping of the bounding box coordinates of the marked plurality of bounding boxes.

Furthermore, the method includes, generating a plurality of highlighted images from the image by highlighting bounding boxes of a word pair from among the plurality of word pairs corresponding to each word with same color. Thereafter, analyzing the plurality of highlighted images by a classifier trained to determine word association by identifying each word pair in each of the plurality of highlighted images into a class among a plurality of classes comprising a) a same row class, b) a same column class, c) a same cell class, and d) an unrelated class.

Further, the method comprises determining a plurality of cells of the table by processing each word pair of the plurality of word pairs of each word and a corresponding class of each word pair identified from among the plurality of classes. The words within each word pair are grouped together as a single cell if the identified class for corresponding word pair is the same cell class, and the words within each word pair are identified to be in standalone cells if the identified class is other than the same cell class.

Furthermore, the method includes generating the digital representation of the table in the image using the determined plurality of cells by: i) creating a first directed graph comprising one or more cells from the plurality of cells that comprise word pairs among the plurality of word pairs that are identified into the same row class, wherein the one or more cells are nodes of the first directed graph and a connecting edge between the one or more cells indicating the one or more cells are in a same row, ii) creating a second directed graph comprising one or more cells from the plurality of cells that comprise word pairs among the plurality of word pairs that are identified into the same column class, wherein the one or more cells are nodes of the second directed graph and a connecting edge between the one or more cells indicating the one or more cells are in a same column; and iii) applying, to the first directed graph and the second directed graph, cell spanning, matrix generation and tagging to generate the digital representation of the table from the first directed graph and the second directed graph.

In another aspect, a system for table structure recognition via deep spatial association of words is provided. is provided. The system comprises a memory storing instructions; one or more Input/Output (I/O) interfaces; and one or more hardware processors coupled to the memory via the one or more I/O interfaces, wherein the one or more hardware processors are configured by the instructions to receive an image of the table and identify a plurality of words in the table by marking a plurality of bounding boxes defined by bounding box coordinates corresponding to the plurality of words, by using a text region bounding box technique.

Further, the system is configured to generate a plurality of word pairs for each word among the plurality of words by pairing each word with one or more words among the plurality of words. Generating the plurality of word pairs comprises: i) pairing each word with a first set of words comprising a first predefined number of immediate top neighbors of each word, wherein the first set of words are marked by a corresponding first set of bounding boxes from among the plurality of bounding boxes. ii) pairing each word with a second set of words comprising a second predefined number of immediate left neighbors of each word, wherein the second set of words are marked by a corresponding second set of bounding boxes from among the plurality of bounding boxes, iii) merging, for each word, the paired first set of words and the paired second set of words to generate a merged word pair list, and iv) eliminating redundant pairs from the merged word pair list to generate the plurality of word pairs, wherein elimination is based on overlapping of the bounding box coordinates of the marked plurality of bounding boxes.

Furthermore, the system is configured to generate a plurality of highlighted images from the image by highlighting bounding boxes of a word pair from among the plurality of word pairs corresponding to each word with same color. Thereafter, the system is configured to analyze the plurality of highlighted images by a classifier trained to determine word association by identifying each word pair in each of the plurality of highlighted images into a class among a plurality of classes comprising a) a same row class, b) a same column class, c) a same cell class, and d) an unrelated class.

Further, the system is configured to determine a plurality of cells of the table by processing each word pair of the plurality of word pairs of each word and a corresponding class of each word pair identified from among the plurality of classes. The words within each word pair are grouped together as a single cell if the identified class for corresponding word pair is the same cell class, and the words within each word pair are identified to be in standalone cells if the identified class is other than the same cell class.

Furthermore, the system is configured to generate the digital representation of the table in the image using the determined plurality of cells by: i) creating a first directed graph comprising one or more cells from the plurality of cells that comprise word pairs among the plurality of word pairs that are identified into the same row class, wherein the one or more cells are nodes of the first directed graph and a connecting edge between the one or more cells indicating the one or more cells are in a same row, ii) creating a second directed graph comprising one or more cells from the plurality of cells that comprise word pairs among the plurality of word pairs that are identified into the same column class, wherein the one or more cells are nodes of the second directed graph and a connecting edge between the one or more cells indicating the one or more cells are in a same column; and iii) applying, to the first directed graph and the second directed graph, cell spanning, matrix generation and tagging to generate the digital representation of the table from the first directed graph and the second directed graph.

In yet another aspect, there are provided one or more non-transitory machine-readable information storage mediums comprising one or more instructions, which when executed by one or more hardware processors causes a method for table structure recognition via deep spatial association of words is provided.

The method includes receiving an image of the table and identify a plurality of words in the table by marking a plurality of bounding boxes defined by bounding box coordinates corresponding to the plurality of words, by using a text region bounding box technique.

Further, the method includes generating a plurality of word pairs for each word among the plurality of words by pairing each word with one or more words among the plurality of words. Generating the plurality of word pairs comprises: i) pairing each word with a first set of words comprising a first predefined number of immediate top neighbors of each word, wherein the first set of words are marked by a corresponding first set of bounding boxes from among the plurality of bounding boxes. ii) pairing each word with a second set of words comprising a second predefined number of immediate left neighbors of each word, wherein the second set of words are marked by a corresponding second set of bounding boxes from among the plurality of bounding boxes, iii) merging, for each word, the paired first set of words and the paired second set of words to generate a merged word pair list, and iv) eliminating redundant pairs from the merged word pair list to generate the plurality of word pairs, wherein elimination is based on overlapping of the bounding box coordinates of the marked plurality of bounding boxes.

Furthermore, the method includes, generating a plurality of highlighted images from the image by highlighting bounding boxes of a word pair from among the plurality of word pairs corresponding to each word with same color. Thereafter, analyzing the plurality of highlighted images by a classifier trained to determine word association by identifying each word pair in each of the plurality of highlighted images into a class among a plurality of classes comprising a) a same row class, b) a same column class, c) a same cell class, and d) an unrelated class.

Further, the method comprises determining a plurality of cells of the table by processing each word pair of the plurality of word pairs of each word and a corresponding class of each word pair identified from among the plurality of classes. The words within each word pair are grouped together as a single cell if the identified class for corresponding word pair is the same cell class, and the words within each word pair are identified to be in standalone cells if the identified class is other than the same cell class.

Furthermore, the method includes generating the digital representation of the table in the image using the determined plurality of cells by: i) creating a first directed graph comprising one or more cells from the plurality of cells that comprise word pairs among the plurality of word pairs that are identified into the same row class, wherein the one or more cells are nodes of the first directed graph and a connecting edge between the one or more cells indicating the one or more cells are in a same row, ii) creating a second directed graph comprising one or more cells from the plurality of cells that comprise word pairs among the plurality of word pairs that are identified into the same column class, wherein the one or more cells are nodes of the second directed graph and a connecting edge between the one or more cells indicating the one or more cells are in a same column; and iii) applying, to the first directed graph and the second directed graph, cell spanning, matrix generation and tagging to generate the digital representation of the table from the first directed graph and the second directed graph.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 4A and 4B (collectively referred as FIG. 4) illustrate generation of word pairs for an example image of the table based on immediate left neighbors and immediate top neighbors' approach, in accordance with some embodiments of the present disclosure.

FIG. 6A depicts a first sample highlighted image generated from the image with each sample comprising a single word pair with words highlighted along marked bounding boxes, in accordance with some embodiments of the present disclosure.

FIG. 6B depicts a second sample highlighted image generated from the image with each sample comprising a single word pair with words highlighted along marked bounding boxes, in accordance with some embodiments of the present disclosure.

FIG. 6C depicts a third sample highlighted image generated from the image with each sample comprising a single word pair with words highlighted along marked bounding boxes, in accordance with some embodiments of the present disclosure.

FIG. 6D depicts a fourth sample highlighted image generated from the image with each sample comprising a single word pair with words highlighted along marked bounding boxes, in accordance with some embodiments of the present disclosure.

FIG. 7 depicts words identified to be lying in same cell of the table, in accordance with some embodiments of the present disclosure.

FIG. 10 depicts a digital representation of the table generated by tagging rows of the cell matrix and marking position of each cell to generate a HTML table representation, in accordance with some embodiments of the present disclosure.

FIG. 11 depicts a displayed digital table generated in accordance with the HTML table representation generated for the table in the image, in accordance with some embodiments of the present disclosure.

Figure 1A:
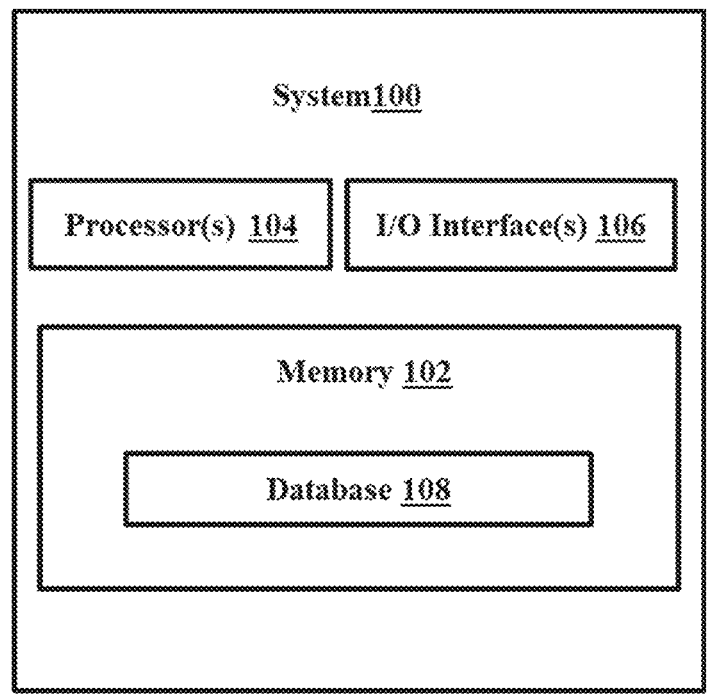
FIG. 1A is a functional block diagram of a system for Table Structure Recognition (TSR) via deep spatial association of words, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

State of art techniques that utilize spatial association based Table structure Recognition (TSR) have limitation in selecting minimal but most informative word pairs to generate digital table representation. Embodiments of the present disclosure provide a method and a system for TSR from an input table image via deep spatial association of words using an optimal number of word pairs, analyzed by a single classifier to determine word association. The optimal number of word pairs are identified by utilizing immediate left neighbors and immediate top neighbors approach followed by redundant word pair elimination, thus enabling accurate capture of structural feature of even complex table images via minimal word pairs. The reduced number of word pairs in combination with the single classifier trained to determine the word associations into classes comprising as same cell, same row, same column and unrelated, provides TSR pipeline with reduced computational complexity, consuming less resources still generating more accurate digital representation of complex tables.

Referring now to the drawings, and more particularly to FIGS. 1A through 11, where similar reference characters denote corresponding features consistently throughout the figures, there are shown preferred embodiments and these embodiments are described in the context of the following exemplary system and/or method.

FIG. 1A is a functional block diagram of a system 100 for Table Structure Recognition (TSR) via deep spatial association of words, in accordance with some embodiments of the present disclosure.

In an embodiment, the system 100, also alternatively referred to as Table Structure Recognition via Deep Spatial Association of Words (TSA-DSAW) system, includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that can stores the images of the tables provided as input to the system 100, intermediate processed images, generated word pairs, cell matrices generated for tables in the input images, generated digital representation of images such as HTML representation and the like. Further, the memory 102 includes modules for word extraction, word pair generator, a classifier for word2word association, a digital representation generator, for example a HTML generator, an evaluation model and other modules required for TSR via deep spatial association of words. The modules in the memory 102 are executed by the processor(s) 104 and explained further in conjunction with FIG. 1B. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with FIG. 1B, flow diagram of FIG. 2 and example of FIGS. 3 through 11.

Figure 1B:
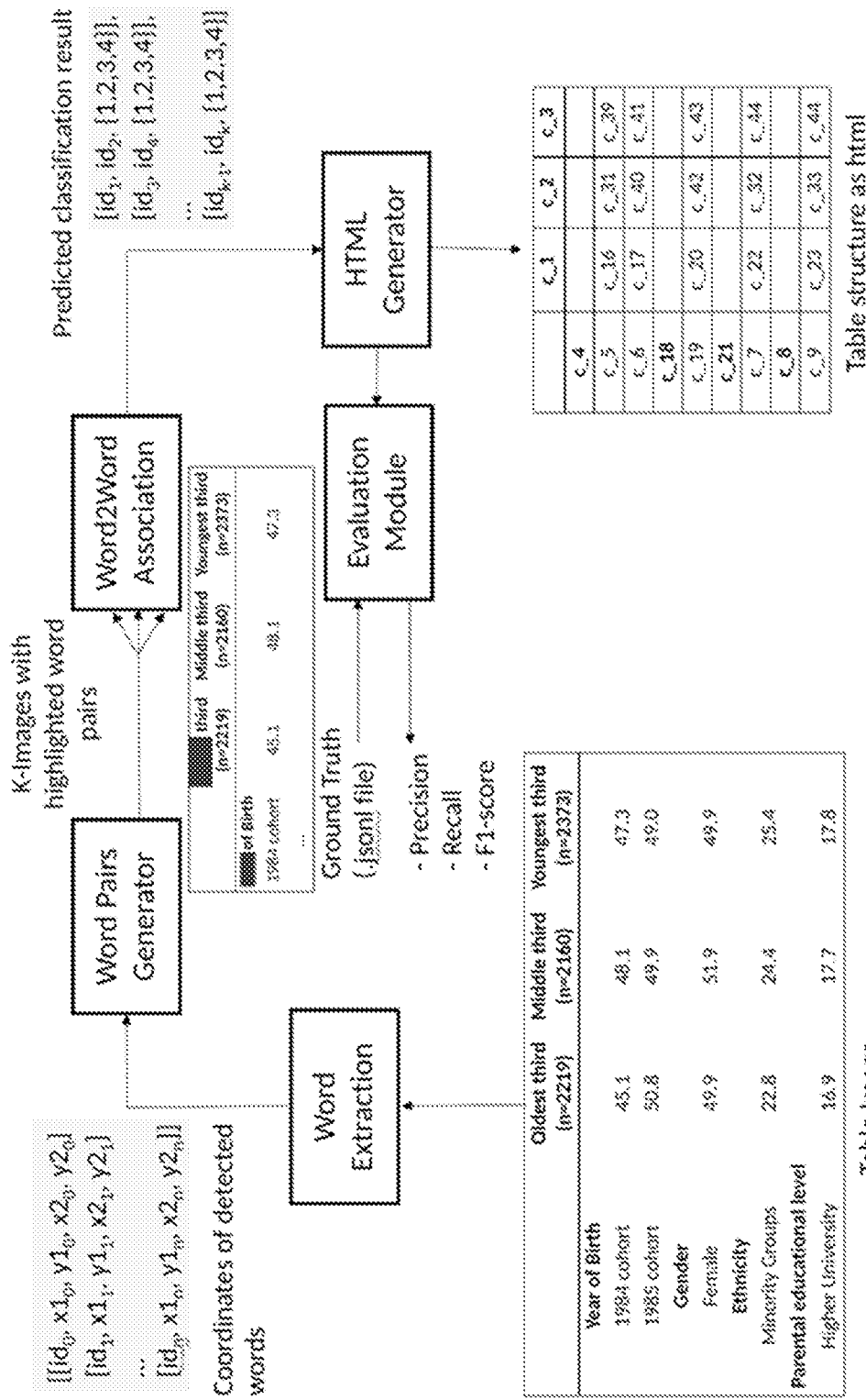
FIG. 1B illustrates pipeline of functional components of the system of FIG. 1A, in accordance with some embodiments of the present disclosure.

FIG. 1B illustrates pipeline of functional components of the system 100 of FIG. 1A, in accordance with some embodiments of the present disclosure and is explained in conjunction with steps of method 200 depicted in FIG. 2

Figure 2A:
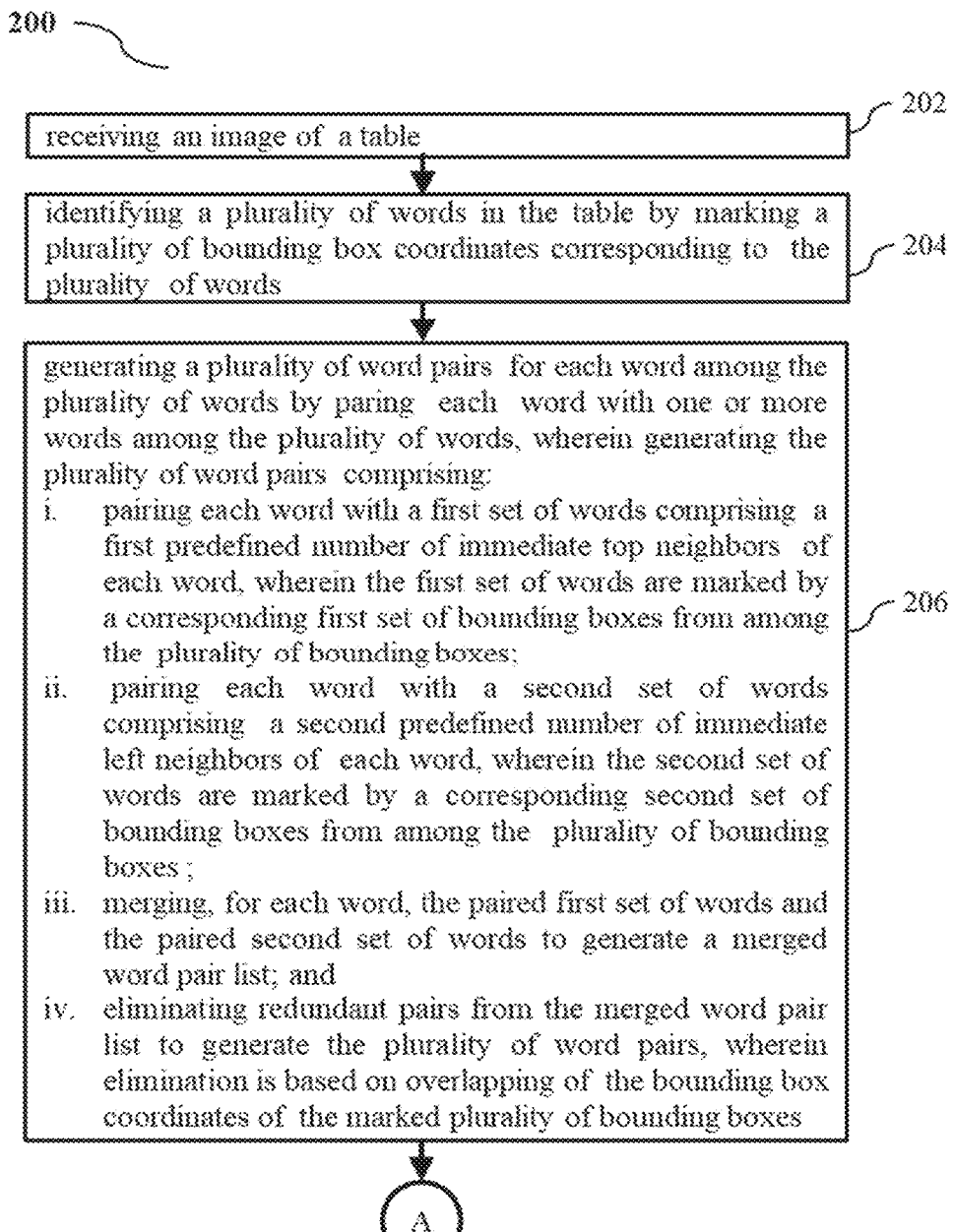
FIGS. 2A and 2B (collectively referred as FIG. 2) is a flow diagram illustrating a method for table structure recognition via deep spatial association of words using the system of FIG. 1A, in accordance with some embodiments of the present disclosure.
Figure 2B:
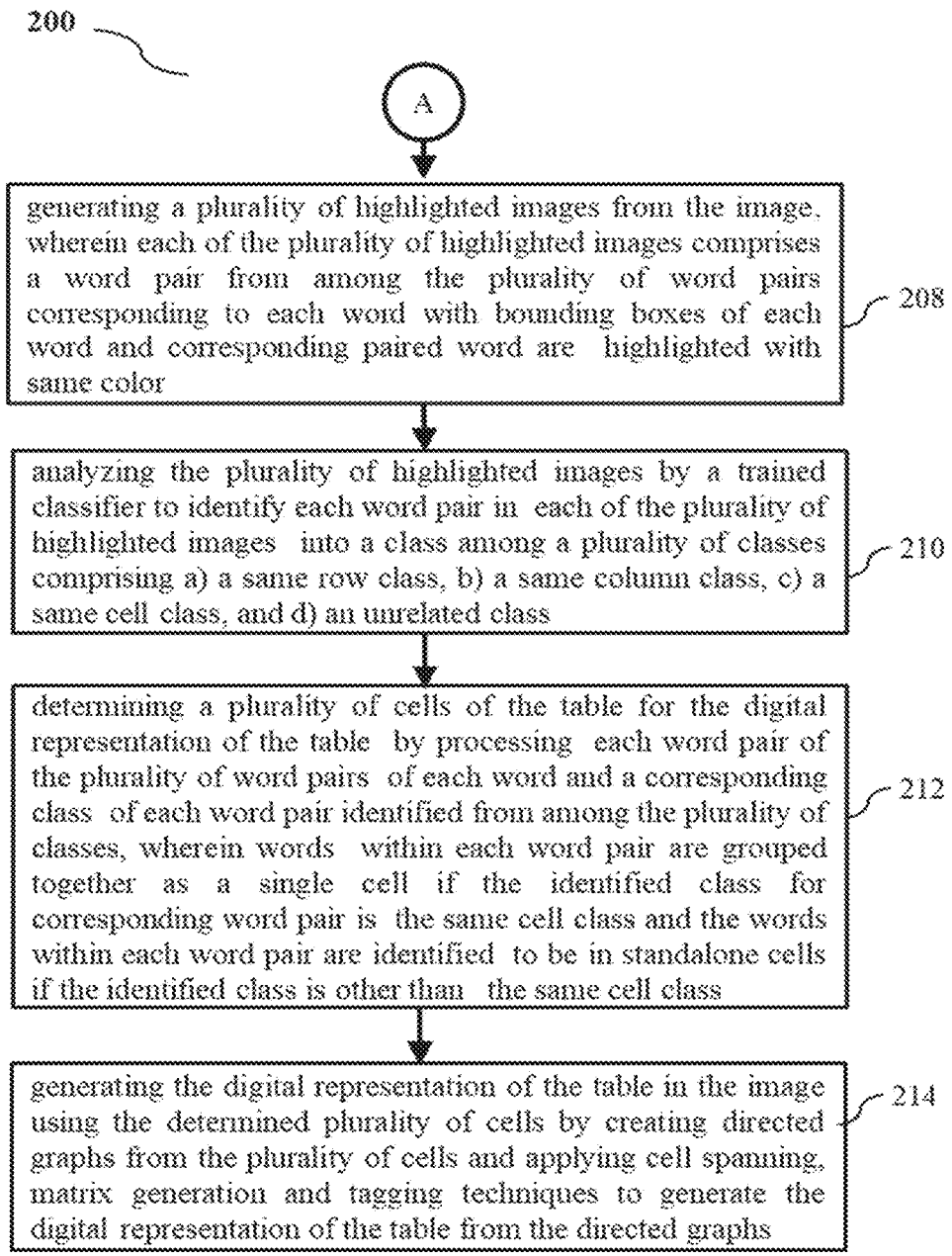

FIGS. 2A and 2B (collectively referred as FIG. 2) is a flow diagram illustrating a method 200 for table structure recognition via deep spatial association of words, using the system of FIG. 1A, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1A, the steps of flow diagram as depicted in FIG. 2 and example depicted in FIGS. 3 through 11. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 3:
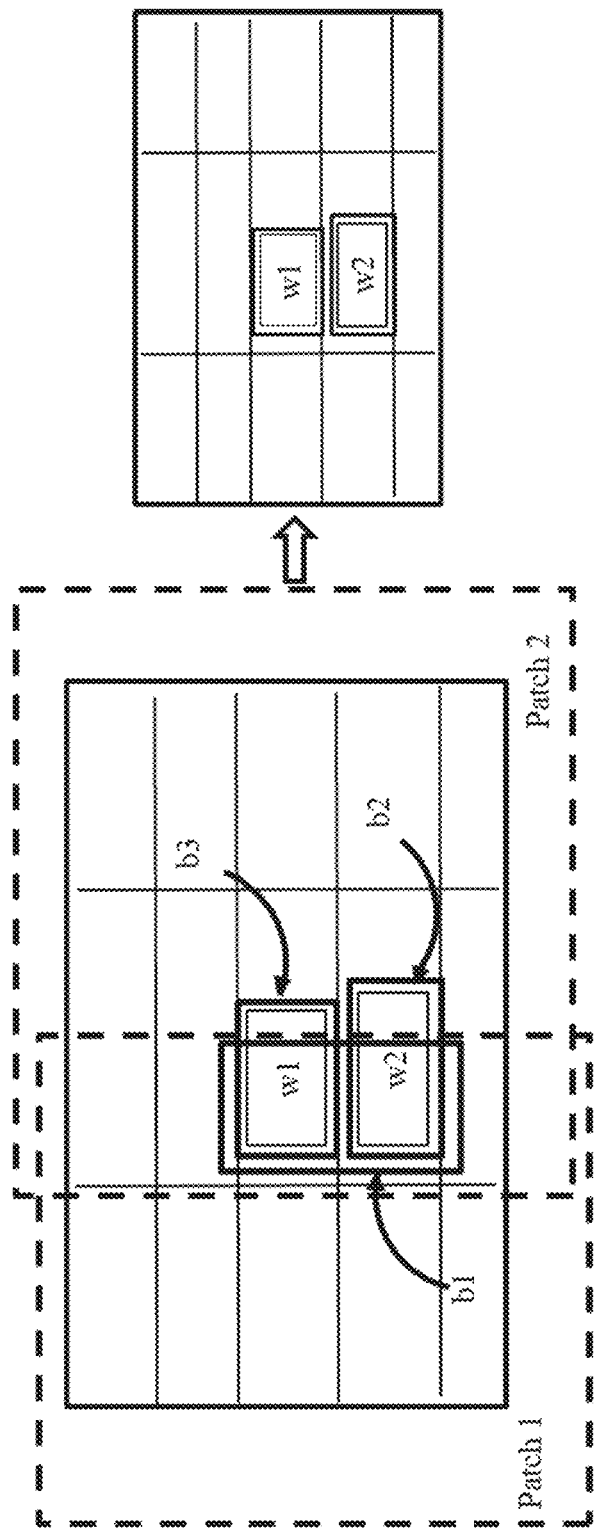
FIG. 3 is an example depicting processing of an input image of a table to mark bounding boxes by detecting words in the table, in accordance with some embodiments of the present disclosure.

Referring to the steps of the method 200, at step 202 of the method 200, the one or more hardware processors 104 receive an image of the table. At step 204 of the method 200, the one or more hardware processors 104 identify a plurality of words in the table by marking a plurality of bounding boxes, corresponding to the plurality of words. The bounding boxes are defined by bounding box coordinates such as (x1,y1 and x2, y2), which refer to diagonal coordinates of a bounding box. Any known text region bounding box technique can be utilized. As depicted in FIG. 1B at step 204, the image, interchangeably referred to as input image or table image is processed by the word extractor. FIG. 3 is an example depicting processing of the input image of the table to mark bounding boxes by detecting words in the table, in accordance with some embodiments of the present disclosure. The input image is divided into overlapping patches of size 512×512 having 50% overlap with adjacent patches. These overlapping patches are then passed through a CRAFT™ text detector which localizes individual text-regions and gives corresponding bounding boxes of each of the words in the table. Next, the bounding box coordinates of words present in the overlapped patches are merged which may lead to some redundancy in scenarios where the overlaps span multiple rows or columns. To circumvent this issue, in an embodiment the entire image is scanned in small frames and the biggest box is removed, where multiple boxes cover a single frame. Finally, the extracted text-regions are read using Tesseract1™.

Once the bounding boxes are marked for each of the words, at step 206 of the method 200, the one or more hardware processors 104 generate a plurality of word pairs for each word among the plurality of words. Each word is paired with one or more words among the plurality of words. As depicted in FIG. 1B, the plurality of word pairs are generated by the word pair generators. The steps of generating the plurality of word pairs comprise:

i. Pairing each word with a first set of words comprising a first predefined number of immediate top neighbors of each word. The first set of words are marked by a corresponding first set of bounding boxes from among the plurality of bounding boxes.
ii. Pairing each word with a second set of words comprising a second predefined number of immediate left neighbors of each word. The second set of words are marked by a corresponding second set of bounding boxes from among the plurality of bounding boxes.
iii. Merging, for each word, the paired first set of words and the paired second set of words to generate a merged word pair list.
iv. Eliminating redundant pairs from the merged word pair list to generate the plurality of word pairs, also referred to as optimal number of word pairs. The elimination is based on overlapping of the bounding box coordinates of the marked plurality of bounding boxes.

A trivial approach used in the art for generating word pairs is that given a word in a collection of w words, make pairs with the remaining (w−1) words leading to $O(w^2)$ complexity. However, this approach is inefficient requiring large number of word pairs. Therefore, the method 200 disclosed herein utilizes a dynamic programming based word-pair generation technique with a linear time-complexity of $O((m+n)w)$, indicating that to generate a digital representation of a table a maximum of (m+n).w word-pairs are sufficient for digital representation of the table, where m (the first predefined number) and n (the second predefined number) are the number of rows and columns respectively. The cm' immediate left neighbors and the 'n' immediate top neighbors, as disclosed herein, are sufficient for evaluation for nested-rows and nested-columns, respectively in any complex table.

The first predefined number of immediate left neighbors (m rows) and the second predefined number of immediate top neighbors (n) can be determined during a preprocessing step of the method 200. The preprocessing step comprises collecting and binning the plurality of words with respect to y-coordinates of the bounding boxes to group words in same row. The number of bins thus created during the binning defines the first predefined number of immediate left neighbors m rows). Similarly, the method 200 perform collecting and binning the plurality of words with respect to x-coordinates of the bounding boxes to group words in same column. The number of bins created during the binning defines the second predefined number of immediate top neighbors. Thus, the method automatically identifies 'm' and 'n' for a given input table image during the preprocessing step, prior to the word extraction process.

Figure 4B:
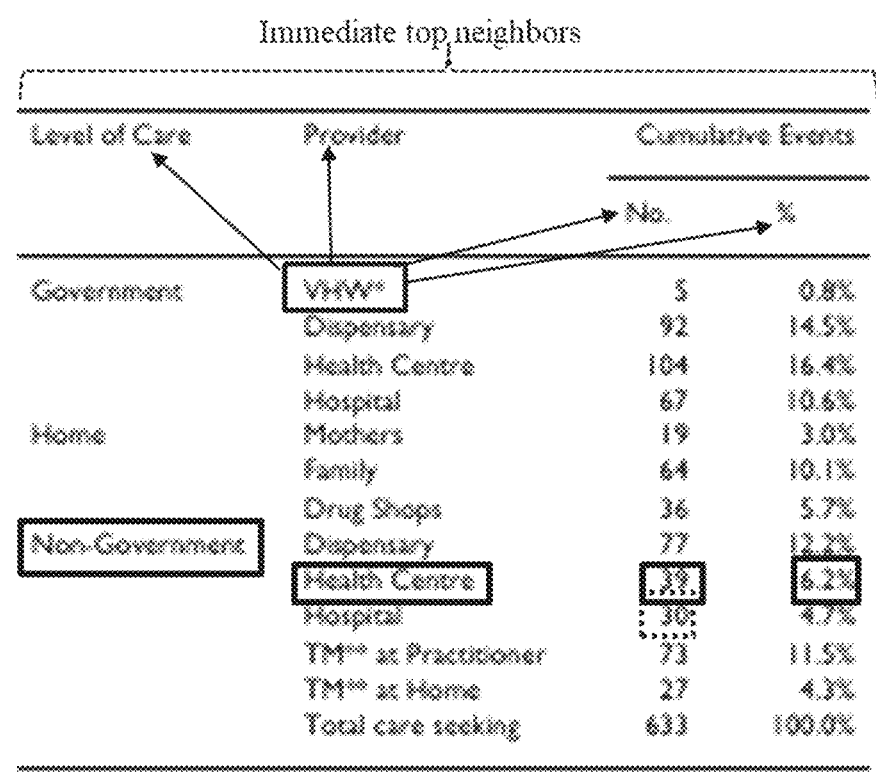

FIGS. 4A and 4B (collectively referred as FIG. 4) illustrate generation of word pairs, for an example table image, based on immediate left neighbors and immediate top neighbors' approach, in accordance with some embodiments of the present disclosure. Thus, for the word 'VHW' in the example table, the immediate top neighbors (n=4 columns) are "Level of Care, Provider, No, %". Similarly, the immediate left neighbors (m=15 rows) are "Level of care, Government, Home, Non-Government". It is to be noted here that m and n are the maximum number of words to look for. It is to be understood that the word 'level of care' for sake of explanation herein is treated as single word, however in actual execution of the method 220 it can be identified as three separate words and method 220 would be considering only the nearest word.

Figure 5A:
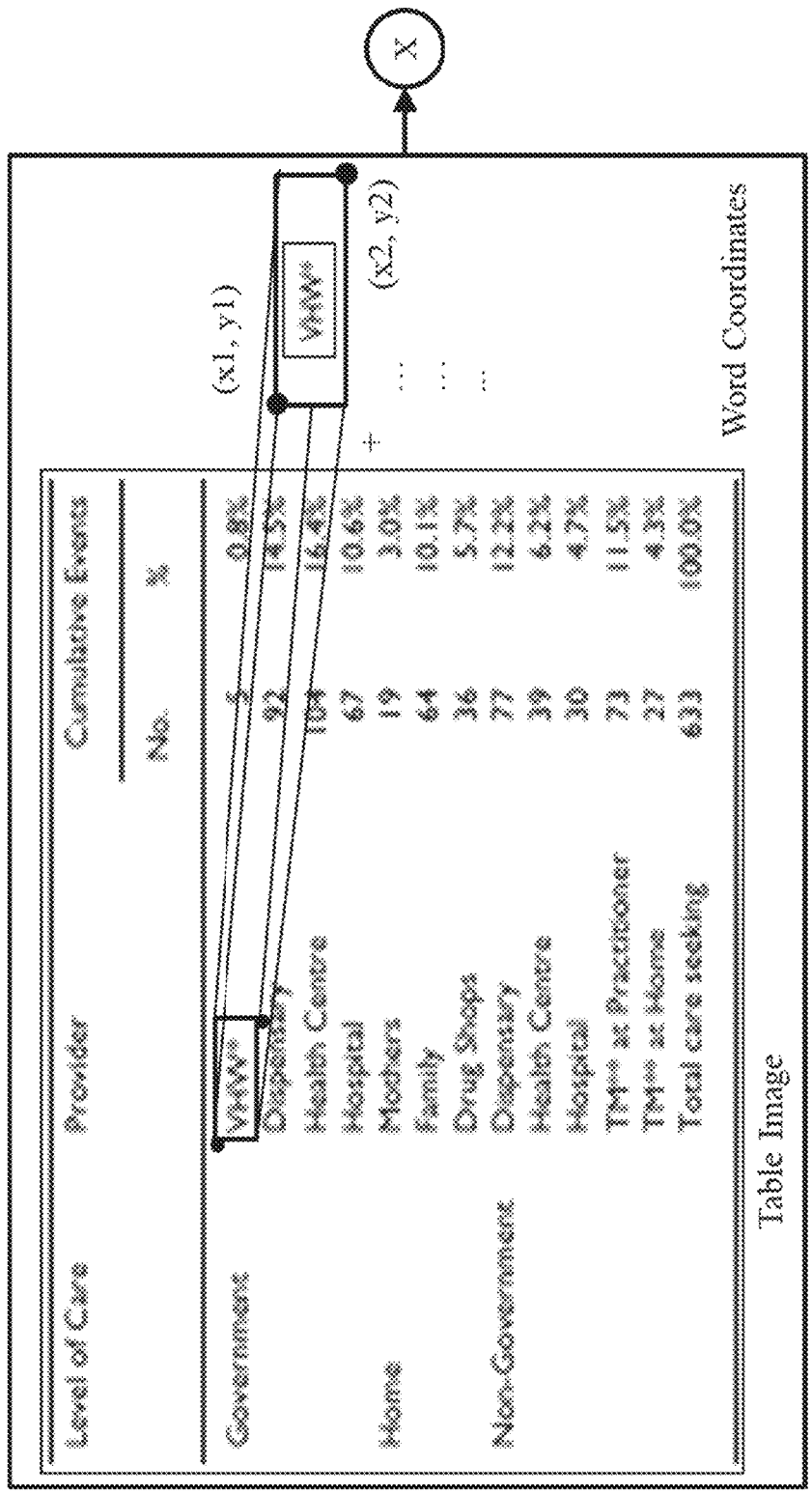
FIGS. 5A and 5B (collectively referred as FIG. 5) depict obtaining optimal number of word pairs from the generated word pairs by eliminating redundant word pairs, in accordance with some embodiments of the present disclosure.
Figure 5B:
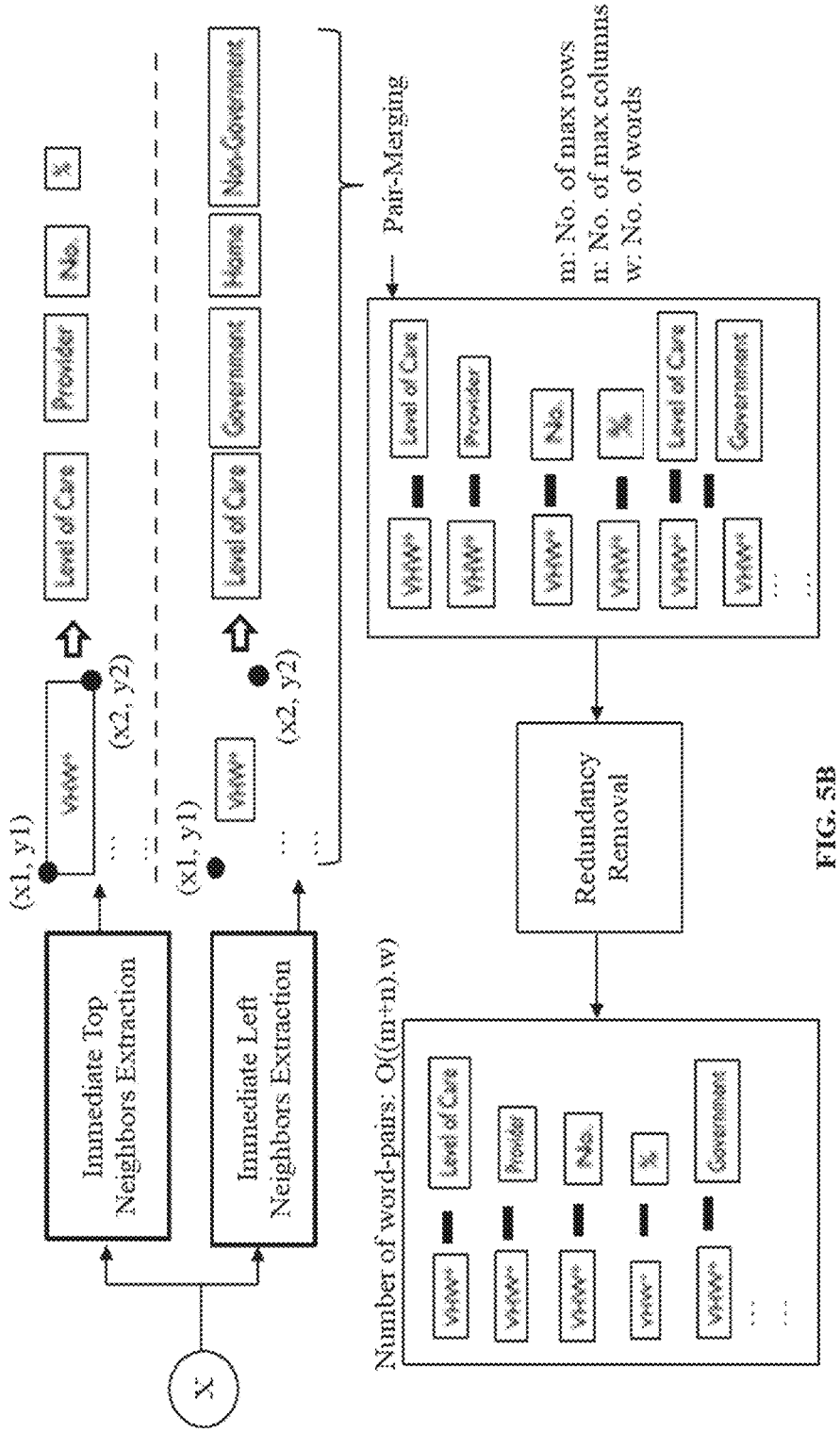

FIGS. 5A and 5B (collectively referred as FIG. 5) depict obtaining optimal number of word pairs from the generated word pairs by eliminating redundant word pairs, in accordance with some embodiments of the present disclosure. As can be observed in FIG. 5 "VHW-Level of Care" is repeated and the repetition is redundant and eliminated.

Once the plurality of word pairs (optimal number of word pairs) are extracted, then at step 208 of the method 200, the one or more hardware processors 104, generate a plurality of highlighted images from the image by highlighting bounding boxes of a word pair from among the plurality of word pairs corresponding to each word with same color, for example red color . . . . The highlighted images having solid colored boxes indicating word pairing makes word pairing of the method disclosed language independent. FIGS. 6A through 6D (collectively referred as FIG. 6) depicts sample highlighted images generated from the image with each sample comprising a single word pair with words highlighted along marked bounding boxes, in accordance with some embodiments of the present disclosure. The FIG. 6 depicts few highlighted images for word 'VHW' (depicted in FIG. 5) with FIGS. 6A and 6B depicting sample images corresponding to two immediate left neighbors. Similarly, FIGS. 6C and 6D depict sample images corresponding to two immediate top neighbors. Similarly, highlighted images are created for each pair of each word of the table generating say K images, wherein approximately $K=O((m+n)w)$.

At step 210 of the method 200, the one or more hardware processors 104, analyze the plurality of highlighted images (K images as depicted in FIG. 1B) by a classifier trained to determine word2word association among the words in each pair of each word, as depicted in FIG. 1B. The word association is determined by identifying each word pair in each of the plurality of highlighted images into a class among a plurality of classes comprising a) a same row class, b) a same column class, c) a same cell class, and d) an unrelated class by the trained classifier.

The classifier performing the word2word association is for example a DenseNet121 based classifier that exploits the spatial relationship between different word-pairs such word belonging to 'same row', 'same column', 'same cell' and 'unrelated' for identifying table-structure. In order to train the classifier for Word2Word Association, 3600 tables were used randomly, which were selected from train-set of PubTabNet dataset to obtain input images of size 224×224 having highlighted word-pairs. The solid-color boxes are used to represent highlighted word-pairs which also eliminates the OCR and language dependency the system 100. However, since images herein are represented in black and white, it is to be understood that the solid black color is representative of a color which the classifier is able to recognize distinctly in practical system implementation. In one implementation, the highlight can be "red' color. This allows the system 100 to entirely focus on the spatial bounds and hence, learn the spatial relationships between them. 48 k such input table images were generated covering nested/harder cases along with simpler cases. Nested cases are the word-pairs which are related with "Same Row/Column" association but structure is nested in terms of multiple-spans. On the other hand, harder cases are those pairs that are difficult to infer such as, pairs which are quite far away but are in same cell or are near to each other but are not related in anyway. The proportion of simple and hard cases is kept equal in the training-set.

At step 212 of the method 200, the one or more hardware processors 104 determine a plurality of cells of the table for the digital representation of the table by processing each word pair of the plurality of word pairs of each word and a corresponding class of each word pair identified from among the plurality of classes. The words within each word pair are grouped together as a single cell if the identified class for corresponding word pair is the same cell class. Contrary, words within each word pair are identified to be in stand-alone cells if the identified class is other than the same cell class. FIG. 7 depicts words identified to be lying in same cell of the table, in accordance with some embodiments of the present disclosure.

At step 214 of the method 200, the one or more hardware processors 104, generate the digital representation of the table in the image using the determined plurality of cells by:
 i. Creating a first directed graph comprising one or more cells from the plurality of cells that comprise word pairs among the plurality of word pairs that are identified into the same row class. The one or more cells are nodes of the first directed graph and a connecting edge between the one or more cells indicating the one or more cells are in same row.
 ii. Creating a second directed graph comprising one or more cells from the plurality of cells that comprise word pairs among the plurality of word pairs that are identified into the same column class. The one or more cells are nodes of the second directed graph and a connecting edge between the one or more cells indicating the one or more cells are in same column.

Figure 8C:
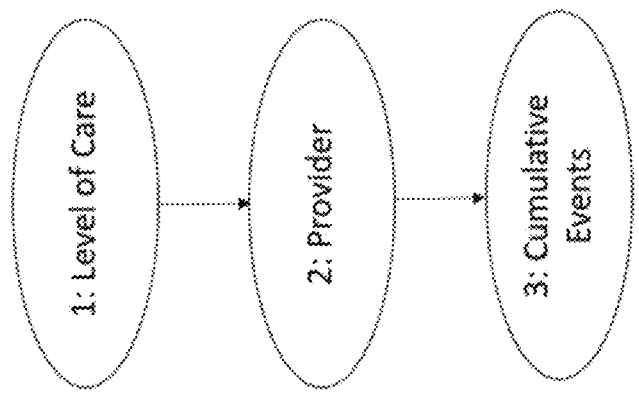
FIGS. 8A, 8B, and 8C (collectively referred as FIG. 8) depict partial directed graphs generated using identified cells of classified word pairs, in accordance with some embodiments of the present disclosure.
Figure 8B:
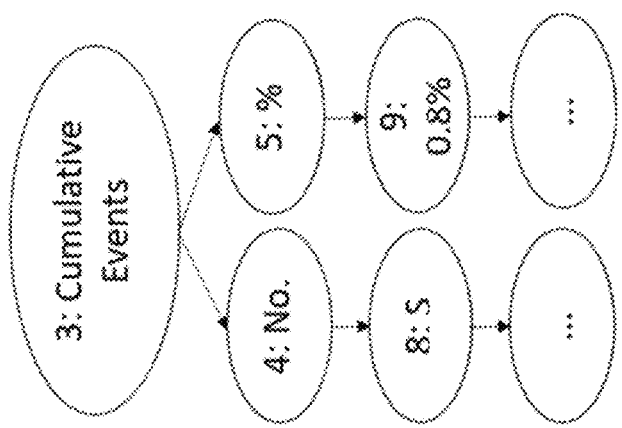
Figure 8A:
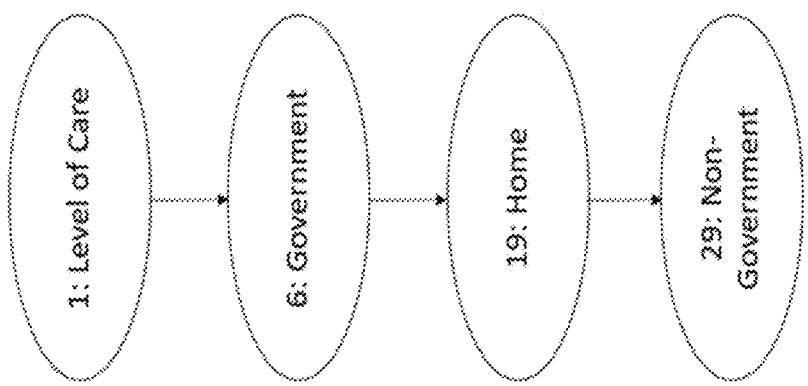

FIGS. 8A through 8C (collectively referred as FIG. 8) depict partial directed graphs generated using identified cells of classified word pairs, in accordance with some embodiments of the present disclosure. Referring now to partial column-graphs of the entire graph for the example table of FIG. 5A. The nodes are depicted as <Cell_Id>: <Text> for explanation purpose. As depicted in FIG. 8A, cells in the same column create a chain in the order of their appearance in the table. The column spanning for cell 'Non-Government' (having id: 29) is set to 1 (as default value for no-child cells). For cell 'Home' (id: 19) the column-span is 1 since it has single child with 1 column-span. Similarly, for cells 'Government' (id: 6) and 'Level of Care' (id: 1) column-span value is also 1.

For the nested case as shown in FIG. 8B, the branching is created at Level 0. This will account for column spanning of cell 'Cumulative Events' (id: 3) as 2 because both of its child has further single branching with column-span as 1. FIG. 8A and FIG. 8B are parts (partial graphs) of the first directed graph. Further, as in FIG. 8C (partial graph of the second directed graph), the cells in the same row have created a chain in the order of their appearance in the table. The row spanning for each cell is 1 since there is no nesting.

Once the directed graphs (the first directed graph and the second directed graph) are generated, then at step 216, the one or more hardware processors 104 apply, to the first directed graph and the second directed graph, cell spanning, matrix generation and tagging to generate the digital representation of the table from the first directed graph and the second directed graph.

Figure 9:
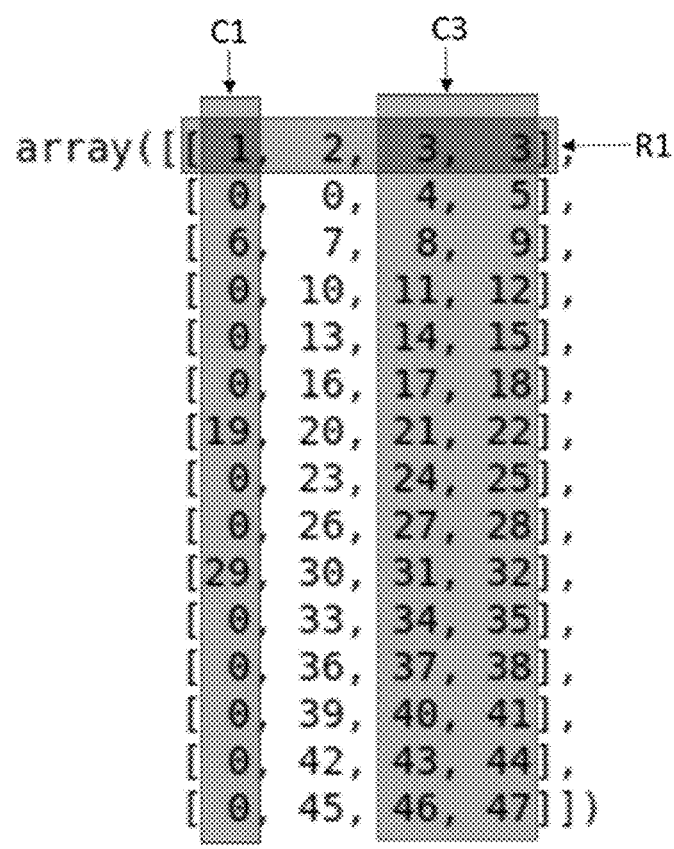
FIG. 9 depicts a cell matrix generated from the directed graphs, in accordance with some embodiments of the present disclosure.

Processing the directed graphs result in a cell matrix as depicted in FIG. 9. In the cell matrix herein, cell ids are used rather than the actual words to keep the diagram simple. As marked by box C1: there are four cells with 1, 6, 19, 29 in same column. '0' are shown for empty cells. C3 column shows the nesting at cell_id 3 (corresponding to "Cumulative Events") as is noted in the partial graph of FIG. 8B. In order to show that same cell spans in more than one position, duplication of the cell_id in performed at those positions. Similarly, the rows are as depicted in R1, cell_ids 1, 2, and 3 are allocated to the same row. Since there are no other nodes above nodes: 1, 2, and 3 in the column graph, they are placed at top row in the matrix.

As depicted in FIG. 10, tagging each row of the matrix as <tr> and each position as <td>, the HTML representation of the table is obtained. Also, it can be noted that, while encountering cells with 0 ids, the empty <td> tag is inserted. The row-span and column-span information is attached as attribute to the html tags.

As depicted in FIG. 11, if the words from these cell ids are mapped, the HTML table representation is regained.

Experiments:

Dataset Details: As stated earlier, a subset of table images from Pub-TabNet is used as train-set for training of Word2Word association classifier. For evaluation of the method 200, also referred hereinafter as TSR-DSAW, 4800 table images are randomly selected from val-set of PubTabNet dataset because PubTabNet has not released ground-truth for its test-set. In addition, evaluation is performed on ICDAR13 which includes 152 table images extracted from European Union and US PDF reports.

Evaluation Metrics: The evaluation of table structure is done based on adjacency relations of two cell structures. In order to avoid the errors due to OCR, the cell content and corresponding ground truth is replaced with a unique ID. Adjacency relations with nearest neighbors in horizontal and vertical directions are computed. No links are created when either of the cell is blank. Next, metrics such as precision, recall and f1-score as depicted in FIG. 1B are computed in order to compare the adjacency relations between predicted and ground-truth table structure.

Experimental Results: Comparison results of TSR-DSAW (the system 100) is provided against two state of art methods of TSR—TableNet and DeepDeSRT. It is evident from Table 1 that TSR-DSAW (the system 100) shows significant improvement over existing methods in all the metrics on both the test datasets.

TABLE 1

| Method | TestSet | $Acc_{w2w}$ | Precision | Recall | F1-score |
|---|---|---|---|---|---|
| TSR-DASW | PubTabNet | 0.9287 | 0.9625 | 0.9087 | 0.9348 |
| TableNet | PubTabNet | — | 0.9572 | 0.8788 | 0.9163 |
| TSR-DASW | CDAR13 | 0.9215 | 0.9649 | 0.9195 | 0.9416 |
| TableNet | CDAR13 | — | 0.9255 | 0.8994 | 0.9122 |
| DeepDeSRT | CDAR13 | — | 0.9593 | 0.8736 | 0.9144 |

For instance, in case of PubTabNet test-set, the TSR-DSAW obtains a higher F1-score of 0:9348 as compared to TableNet (0:9163). Similarly, TSR-DSAW beats both TableNet and DeepDeSRT on ICDAR 2013 test-set by a considerable margin and achieves 0:9649, 0:9195 and 0:9416 as precision, recall and F1-score, respectively. The Word2Word association classifier is trained only on images from PubTabNet train-set and is evaluated on the ICDAR 2013 dataset without any further fine-tuning. $Acc_{w2w}$ represents the classification accuracy of word2word association (the classifier). The classification accuracies of Word2Word association are 0:9287 and 0:9215 on PubTabNet and ICDAR 2013 test-sets, respectively.

Thus, the method requires minimal number of word pairs used in combination with the single classifier trained to determine the word associations into classes comprising as same cell, same row, same column and unrelated. This provides TSR pipeline with reduced computational complexity, consuming less resources still generating more accurate digital representation of complex tables.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for table structure recognition to generate digital representation of a table, the method comprising:

receiving, via one or more hardware processors, an image of the table;

identifying, via the one or more hardware processors, a plurality of words in the table by marking a plurality of bounding boxes defined by bounding box coordinates corresponding to the plurality of words, by using a text region bounding box technique;

generating, via the one or more hardware processors, a plurality of word pairs for each word among the plurality of words by pairing each word with one or more words among the plurality of words, wherein generating the plurality of word pairs comprising:

pairing each word with a first set of words comprising a first predefined number of immediate top neighbors of each word, wherein the first set of words are marked by a corresponding first set of bounding boxes from among the plurality of bounding boxes;

pairing each word with a second set of words comprising a second predefined number of immediate left neighbors of each word, wherein the second set of words are marked by a corresponding second set of bounding boxes from among the plurality of bounding boxes;

merging, for each word, the paired first set of words and the paired second set of words to generate a merged word pair list; and eliminating redundant pairs from the merged word pair list to generate the plurality of word pairs, wherein elimination is based on overlapping of the bounding box coordinates of the marked plurality of bounding boxes;

generating, via the one or more hardware processors a plurality of highlighted images from the image by highlighting bounding boxes of a word pair from among the plurality of word pairs corresponding to each word with same color;

analyzing, via the one or more hardware processors, the plurality of highlighted images by a classifier trained to determine word association by identifying each word pair in each of the plurality of highlighted images into a class among a plurality of classes comprising a) a same row class, b) a same column class, c) a same cell class, and d) an unrelated class;

determining, via the one or more hardware processors, a plurality of cells of the table by processing each word pair of the plurality of word pairs of each word and a corresponding class of each word pair identified from among the plurality of classes, wherein words within each word pair are grouped together as a single cell if the identified class for corresponding word pair is the same cell class, and the words within each word pair are identified to be in standalone cells if the identified class is other than the same cell class; and generating, via the one or more hardware processors, the digital representation of the table in the image using the determined plurality of cells by:

creating a first directed graph comprising one or more cells from the plurality of cells that comprise word pairs among the plurality of word pairs that are identified into the same row class, wherein the one or more cells are nodes of the first directed graph and a connecting edge between the one or more cells indicating the one or more cells are in a same row;

creating a second directed graph comprising one or more cells from the plurality of cells that comprise word pairs among the plurality of word pairs that are identified into the same column class, wherein the one or more cells are nodes of the second directed graph and a connecting edge between the one or more cells indicating the one or more cells are in a same column; and applying, to the first directed graph and the second directed graph, cell spanning, matrix generation and tagging to generate the digital representation of the table.

2. The method of claim 1, the method further comprising collecting and binning the plurality of words with respect to y-coordinates of the bounding boxes to group words in the same row, wherein number of bins created during the binning defines the first predefined number of immediate left neighbors.

3. The method of claim 1, the method further comprising collecting and binning the plurality of words with respect to x-coordinates of the bounding boxes to group words in the same column, wherein number of bins created during the binning defines the second predefined number of immediate top neighbors.

4. A system for table structure recognition via deep spatial association of words, the system comprising:
a memory storing instructions;
one or more Input/Output (I/O) interfaces; and
one or more hardware processors coupled to the memory via the one or more I/O interfaces, wherein the one or more hardware processors are configured by the instructions to:
receive an image of the table;
identify a plurality of words in the table by marking a plurality of bounding boxes defined by bounding box coordinates corresponding to the plurality of words, by using a text region bounding box technique;
generate a plurality of word pairs for each word among the plurality of words by pairing each word with one or more words among the plurality of words, wherein generating the plurality of word pairs comprising:

pairing each word with a first set of words comprising a first predefined number of immediate top neighbors of each word, wherein the first set of words are marked by a corresponding first set of bounding boxes from among the plurality of bounding boxes;

pairing each word with a second set of words comprising a second predefined number of immediate left neighbors of each word, wherein the second set of words are marked by a corresponding second set of bounding boxes from among the plurality of bounding boxes;

merging, for each word, the paired first set of words and the paired second set of words to generate a merged word pair list; and eliminating redundant pairs from the merged word pair list to generate the plurality of word pairs, wherein elimination is based on overlapping of the bounding box coordinates of the marked plurality of bounding boxes;

generate a plurality of highlighted images from the image by highlighting bounding boxes of a word pair from among the plurality of word pairs corresponding to each word with same color;

analyze the plurality of highlighted images by a classifier trained to determine word association by identifying each word pair in each of the plurality of highlighted images into a class among a plurality of classes comprising a) a same row class, b) a same column class, c) a same cell class, and d) an unrelated class;

determine a plurality of cells of the table by processing each word pair of the plurality of word pairs of each word and a corresponding class of each word pair identified from among the plurality of classes, wherein words within each word pair are grouped together as a single cell if the identified class for corresponding word pair is the same cell class, and the words within each word pair are identified to be in standalone cells if the identified class is other than the same cell class; and generate the digital representation of the table in the image using the determined plurality of cells by:

creating a first directed graph comprising one or more cells from the plurality of cells that comprise word pairs among the plurality of word pairs that are identified into the same row class, wherein the one or more cells are nodes of the first directed graph and a connecting edge between the one or more cells indicating the one or more cells are in a same row;

creating a second directed graph comprising one or more cells from the plurality of cells that comprise word pairs among the plurality of word pairs that are identified into the same column class, wherein the one or more cells are nodes of the second directed graph and a connecting edge between the one or more cells indicating the one or more cells are in a same column; and applying, to the first directed graph and the second directed graph, cell spanning, matrix generation and tagging to generate the digital representation of the table.

5. The system of claim 4, further configured to collect and bin the plurality of words with respect to y-coordinates of the bounding boxes to group words in the same row, wherein number of bins created during the binning defines the first predefined number of immediate left neighbors.

6. The system of claim 4, further configured to collect and bin the plurality of words with respect to x-coordinates of the bounding boxes to group words in the same column, wherein number of bins created during the binning defines the second predefined number of immediate top neighbors.

7. One or more non-transitory machine-readable information storage mediums comprising one or more instructions which when executed by one or more hardware processors cause:

receiving, an image of the table;

identifying, a plurality of words in the table by marking a plurality of bounding boxes defined by bounding box coordinates corresponding to the plurality of words, by using a text region bounding box technique;

generating, a plurality of word pairs for each word among the plurality of words by pairing each word with one or more words among the plurality of words, wherein generating the plurality of word pairs comprising:

pairing each word with a first set of words comprising a first predefined number of immediate top neighbors of each word, wherein the first set of words are marked by a corresponding first set of bounding boxes from among the plurality of bounding boxes;

pairing each word with a second set of words comprising a second predefined number of immediate left neighbors of each word, wherein the second set of words are marked by a corresponding second set of bounding boxes from among the plurality of bounding boxes;

merging, for each word, the paired first set of words and the paired second set of words to generate a merged word pair list; and eliminating redundant pairs from the merged word pair list to generate the plurality of word pairs, wherein elimination is based on overlapping of the bounding box coordinates of the marked plurality of bounding boxes;

generating, a plurality of highlighted images from the image by highlighting bounding boxes of a word pair from among the plurality of word pairs corresponding to each word with same color;

analyzing, the plurality of highlighted images by a classifier trained to determine word association by identifying each word pair in each of the plurality of highlighted images into a class among a plurality of classes comprising a) a same row class, b) a same column class, c) a same cell class, and d) an unrelated class;

determining, a plurality of cells of the table by processing each word pair of the plurality of word pairs of each word and a corresponding class of each word pair identified from among the plurality of classes, wherein words within each word pair are grouped together as a single cell if the identified class for corresponding word pair is the same cell class, and the words within each word pair are identified to be in standalone cells if the identified class is other than the same cell class; and generating, the digital representation of the table in the image using the determined plurality of cells by:

creating a first directed graph comprising one or more cells from the plurality of cells that comprise word pairs among the plurality of word pairs that are identified into the same row class, wherein the one or more cells are nodes of the first directed graph and a connecting edge between the one or more cells indicating the one or more cells are in a same row;

creating a second directed graph comprising one or more cells from the plurality of cells that comprise word pairs among the plurality of word pairs that are identified into the same column class, wherein the one or more cells are nodes of the second directed graph and a connecting edge between the one or more cells indicating the one or more cells are in a same column; and applying, to the first directed graph and the second directed graph, cell spanning, matrix generation and tagging to generate the digital representation of the table.

8. The one or more non-transitory machine-readable information storage mediums of claim 7, further comprising collecting and binning the plurality of words with respect to y-coordinates of the bounding boxes to group words in the same row, wherein number of bins created during the binning defines the first predefined number of immediate left neighbors.

9. The one or more non-transitory machine-readable information storage mediums of claim 7, further comprising collecting and binning the plurality of words with respect to x-coordinates of the bounding boxes to group words in the same column, wherein number of bins created during the binning defines the second predefined number of immediate top neighbors.

* * * * *